(12) United States Patent
Pompili

(10) Patent No.: US 11,364,847 B2
(45) Date of Patent: Jun. 21, 2022

(54) HOUSING FOR A PROTECTIVE DEVICE FOR A MOTOR-VEHICLE INTERIOR

(71) Applicant: William Pompili, Shelby Township, MI (US)

(72) Inventor: William Pompili, Shelby Township, MI (US)

(73) Assignee: BOS GMBH & CO. KG, Ostfildern (DE)

( * ) Notice: Subject to any disclaimer, the term of this patent is extended or adjusted under 35 U.S.C. 154(b) by 240 days.

(21) Appl. No.: 16/710,788

(22) Filed: Dec. 11, 2019

(65) Prior Publication Data

US 2020/0189475 A1  Jun. 18, 2020

Related U.S. Application Data

(60) Provisional application No. 62/778,452, filed on Dec. 12, 2018.

(51) Int. Cl.
  *B60R 5/04* (2006.01)
(52) U.S. Cl.
  CPC .................................. *B60R 5/047* (2013.01)
(58) Field of Classification Search
  CPC ....................................................... B60R 5/047
  USPC ................................................. 296/37.16, 98
  See application file for complete search history.

(56) References Cited

U.S. PATENT DOCUMENTS

| | | | |
|---|---|---|---|
| 7,392,834 B2 | 7/2008 | Davenport et al. | |
| 8,322,774 B2 * | 12/2012 | Hofmann | B60R 5/044 |
| | | | 296/37.16 |
| 8,919,414 B2 | 12/2014 | Schleef et al. | |
| 10,369,937 B2 * | 8/2019 | Marchesano | B60R 13/01 |
| 2002/0150748 A1 * | 10/2002 | Delusky | B32B 27/304 |
| | | | 428/297.4 |
| 2003/0126827 A1 | 7/2003 | Davis | |
| 2007/0120391 A1 * | 5/2007 | Hori | B60R 5/047 |
| | | | 296/100.15 |
| 2014/0345810 A1 | 11/2014 | Nofziger | |

FOREIGN PATENT DOCUMENTS

| | | | | |
|---|---|---|---|---|
| CH | 697483 B1 * | 11/2008 | | E04B 1/7641 |
| DE | 102005049989 A1 | 4/2007 | | |
| DE | 102011005819 B4 | 6/2015 | | |
| FR | 3008940 A1 * | 1/2015 | | B60R 5/047 |
| JP | 2008036981 A * | 2/2008 | | |

OTHER PUBLICATIONS

German Office Action issued in corresponding German Application No. 10 2019 200 513.6 dated Nov. 25, 2021 (8 pages).

* cited by examiner

*Primary Examiner* — Joseph D. Pape
(74) *Attorney, Agent, or Firm* — Flynn Thiel, P.C.

(57) ABSTRACT

A housing for a protective device for a motor-vehicle interior, a protective device having such housing and a method for producing such a housing. The housing having a profile formed from a panel-like semi-finished product which is manufactured from plastic and, in a ready-for-use-state, is angled along at least one predetermined folding line, which extends in the longitudinal direction, in order for the angular profile cross section to be formed.

22 Claims, 5 Drawing Sheets

HOUSING FOR A PROTECTIVE DEVICE FOR A MOTOR-VEHICLE INTERIOR

CROSS-REFERENCE TO RELATED APPLICATION

This application claims the benefit of U.S. Provisional Application No. 62/778,452, filed Dec. 12, 2018, the disclosure of which is hereby incorporated by reference in its entirety into this application.

TECHNICAL FIELD

The invention relates to a housing which is intended for a protective device for a motor-vehicle interior and is provided for accommodating at least one winding shaft and at least one flexible sheet-like structure, which is retained on the winding shaft such that it can be wound up thereon and unwound therefrom, having a housing profile, which extends along a longitudinal direction and has an angular profile cross section, bounding an accommodating space for accommodating the at least one winding shaft and the at least one flexible sheet-like structure, and also has a profile opening, which extends into the accommodating space and through which the at least one flexible sheet-like structure can be displaced, during a winding-up and/or unwinding operation, into the accommodating space and/or out of the same. The invention also relates to a protective device having such a housing and to a method for producing such a housing.

BACKGROUND

DE 10 2011 005 819 B4 discloses such a housing which is in the form of a roller-blind cassette and is provided for a protective device in the form of a roller blind for a motor-vehicle interior. The roller blind has a rotatably mounted roller-blind shaft and a flexible sheet-like structure in the form of a roller-blind web, which is retained on the roller-blind shaft such that it can be wound up thereon and unwound therefrom. The roller-blind cassette has a housing profile with an angular profile cross section provided with a slot. The profile cross section bounds an accommodating space, in which the roller-blind shaft and the roller-blind web—in the wound-up state in any case—are accommodated. The roller-blind web can be withdrawn from the roller-blind shaft, out of the housing profile, through a profile opening. In the case of the known roller-blind cassette, the profile opening is formed by said slot. DE 10 2011 005 819 B4 teaches that the housing profile should be manufactured from sheet metal.

It is an object of the invention to provide a housing, a protective device and a method, of the type mentioned in the introduction in each case, which, compared to the prior art, each allow for a simplified manufacturing and/or installation.

This object is achieved, as far as the housing is concerned, in that the housing profile is formed from a panel-like semifinished product which is manufactured from plastic and—in a ready-for-use state—is angled along at least one predetermined folding line, which extends in the longitudinal direction, in order for the angular profile cross section to be formed. The solution according to the invention makes it possible to dispense, in particular, with high-outlay metal-forming techniques for the purpose of forming the angular profile cross section. Instead, the housing profile is formed from a semifinished product which is manufactured from plastic and, in order for the housing profile to be formed, is merely angled along at least one longitudinally extending predetermined folding line. The semifinished product is in the form of an at least essentially planar panel. It is preferably the case that the semifinished product as such is dimensionally stable and can easily be angled, folded and/or bent in the region of the at least one predetermined folding line—in comparison with the rest of the semifinished product. The at least one predetermined folding line can be, in particular, a geometry-related and/or material-related structural weakening of the semifinished product. It is possible for the at least one predetermined folding line to extend longitudinally in a continuous manner or to be interrupted in some regions. The semifinished product and the at least one predetermined folding line are preferably configured such that it is readily possible for the semifinished product to be angled manually along the predetermined folding line. In the ready-for-use state—that is to say once the semifinished product has been angled—the at least one predetermined folding line is arranged in a corner region of the housing profile. The angular profile cross section preferably has a C-shaped or U-shaped basic shape, wherein the basic shape can be provided with further profile portions. If such a basic shape is provided, the semifinished product can be angled along at least two predetermined folding lines. The profile opening can be subsequently separated out of the housing profile and/or formed between semifinished-product ends which are angled in relation to one another. The profile opening preferably extends longitudinally and is in the form of a gap, slot or the like. The profile opening preferably extends over an entire length of the housing profile. The housing profile is preferably open at longitudinally opposite end regions and, to this extent, has an end opening at each end. A respective end cap can be provided in order to close said end openings, it being possible for the end cap to be fitted onto, and/or into, the respective end opening.

In one configuration of the invention, the at least one predetermined folding line is prefabricated on the semifinished product. For example, it is possible for the at least one predetermined folding line to be separated out of the panel-like semifinished product by virtue of material being removed or to be formed in the semifinished product without material being removed. The at least one predetermined folding line extends longitudinally in a continuous manner preferably over an entire length of the semifinished product—and therefore over an entire length of the housing profile. As an alternative, the at least one predetermined folding line can be interrupted in some regions. The at least one predetermined folding line is introduced, preferably in the form of a depression, into a flat side of the semifinished product. For example, the at least one predetermined folding line can be in the form of a groove, of a channel, of an indentation or the like. Since the at least one predetermined folding line is already prefabricated on the semifinished product, manufacturing of the housing can be simplified further.

In a further configuration of the invention, the profile opening is formed between ends of the semifinished product which are angled in relation to one another. This configuration of the invention means that an operation in which the profile opening is subsequently separated out of the housing profile can be dispensed with. This achieves further-simplified manufacturing of the housing. Accordingly, in the case of this configuration of the invention, the profile opening is formed solely by virtue of the semifinished product being angled along the at least one predetermined folding line.

In a further configuration of the invention, the profile cross section has a C-shaped, U-shaped or rectangular basic shape, the semifinished product being angled a number of times at right angles in order to form the same. Accordingly, in the case of this configuration, the semifinished product has at least two longitudinally extending predetermined folding lines. The predetermined folding lines are preferably oriented parallel to one another. This ensures a sufficiently rigid configuration of the housing profile along with the simultaneously low weight.

In a further configuration of the invention, the housing profile—and therefore the semifinished product—has a layered construction with a plurality of different material layers. At least one of the material layers is manufactured from plastic. The material layers are arranged one above the other in the thickness direction of the panel-like semifinished product. The layered construction can be formed, for example, by means of lamination or compression molding, the plurality of material layers being fixed together. The layered construction of the housing profile or of the semifinished product allows for a particularly functional configuration of the housing insofar as different material layers can perform different functions.

In a further configuration of the invention, a load-bearing carrying-structure layer which is manufactured from plastic is provided. The carrying-structure layer provides the housing profile with strength and dimensional stability. The carrying-structure layer is manufactured from an inflexible plastic. In comparison with any further material layers, the carrying-structure layer preferably has an increased layer thickness. The carrying structure layer preferably forms a kind of core of the panel-like semifinished product.

In a further configuration of the invention, the plastic is a glass-fiber-reinforced polypropylene. This choice of material can achieve a sufficient level of strength and dimensional stability for the housing profile along with the simultaneously comparatively low weight.

In a further configuration of the invention, a damping layer which is manufactured from a sound-damping material, preferably a felt, is provided and arranged on the inside. "On the inside" means that the damping layer forms an inner surface of the housing profile, said inner surface being directed toward the accommodating space. The damping layer avoids a build-up of noise in the interior of the housing. Such a build-up of noise can arise—in the installed state of the protective device—as a result of the winding shaft or the flexible sheet-like structure striking against the housing profile from the inside as a result of the driving conditions. Since the damping layer is already provided in the layered construction of the semifinished product, it is possible to dispense with any subsequent inner coating of the housing profile and manufacturing outlay can therefore be reduced.

In a further configuration of the invention, a covering layer which is manufactured from a covering material is provided and arranged on the outside, said covering layer being consistent with a covering material of the motor-vehicle interior, preferably corresponding to the covering material of the motor-vehicle interior. "On the outside" means that the covering layer forms an outer surface of the housing profile. When the housing has been installed in the vehicle, said outer surface is directed toward the motor-vehicle interior. The covering material can be a textile, a leather or some other covering material which is conventionally used in a motor-vehicle interior. Since the covering material of the covering layer is consistent with the covering material of the motor-vehicle interior, a pleasing appearance and therefore an impression of improved quality can be achieved. The covering layer is a constituent part of the layered construction of the semifinished product. It is thus possible to do away with an operation for subsequently applying the covering material to the outside of the housing profile, and to reduce outlay. Manufacturing is simplified further as a result.

In a further configuration of the invention, the panel-like semifinished product is produced by means of compression molding. Compression molding is known, in principle, as a method for producing flat or slightly curved components from plastic in the field of plastics technology and engineering. Producing the semifinished product by means of compression molding has proved to be particularly advantageous here, in particular if the semifinished product has a layered construction with a plurality of different material layers. Compression molding is involved in a particularly advantageous configuration of the invention.

The invention also relates to a method for producing a housing according to the above description.

The object on which the invention is based is achieved, as far as the method is concerned, in that it comprises a step: a panel-like semifinished product which is manufactured from plastic is angled along at least one predetermined folding line, which extends in the longitudinal direction. This allows the profile of the housing to be manufactured in a particularly straightforward manner. In particular, high-outlay metal machining or the like can be dispensed with. The panel-like semifinished product is preferably angled a number of times along a respective predetermined folding line. This allows for example a C-shaped, U-shaped or rectangular basic shape of the angular profile cross section to be formed in a particularly straightforward manner. For the avoidance of repetition, reference is made to the features which were disclosed in conjunction with the above-described housing and, correspondingly, also apply in conjunction with the method according to the invention. It is, of course, the case in this respect that the panel-like semifinished product can have, for example, a layered construction, with a plurality of different material layers, according to the above description.

In a further configuration of the invention, the method comprises a step: the semifinished product is heated. The operation of heating the semifinished product renders the latter more flexible than when it is in a cold state, and it can therefore be angled more easily. This provides for further-simplified production of the housing. For this purpose, the semifinished product can be heated either as a whole or merely locally, for example in the region of the at least one predetermined folding line.

In a further configuration of the invention, the method comprises a step: at least one plastic is subjected to compression molding in order for the panel-like semifinished product to be formed, wherein the at least one predetermined folding line is incorporated in the semifinished product. Compression molding is known, in principle, as a method for producing planar or slightly curved components from plastic and has proven to be particularly advantageous here.

In a further configuration of the invention, together with the at least one plastic, at least one further material layer is subjected to compression molding. This results in the semifinished product, and therefore the housing profile, having a layered construction. The further material layer can be manufactured, for example, from a sound-damping material, preferably a felt. A further material layer can be manufactured, for example, from a covering material, such as a textile, a leather or the like. The multilayered compression molding of the semifinished product makes it possible to dispense with a subsequent application of the damping and/or covering material to the housing profile. Manufacturing is significantly simplified further as a result.

The invention also relates to a protective device for a motor-vehicle interior, having at least one winding shaft and at least one flexible sheet-like structure, which is retained on the winding shaft such that it can be wound up thereon and unwound therefrom and which can be displaced between an angled, protective position and a wound-up, stowage position.

The object on which the invention is based is achieved, as far as the protective device is concerned, in that a housing according to the above description is provided for accommodating the winding shaft and the wound-up flexible sheet-like structure. The protective device is preferably designed in the form of a loading-space cover or of a loading-space partition net. As an alternative, it is possible for the protective device to be designed in the form of a sunshade and to be provided for the purpose of shading a vehicle-window surface.

BRIEF DESCRIPTION OF THE DRAWINGS

Further advantages and features of the invention can be gathered from the claims and from the following description of preferred exemplary embodiments of the invention, which are illustrated with reference to the drawings, in which:

DETAILED DESCRIPTION

Figure 1:
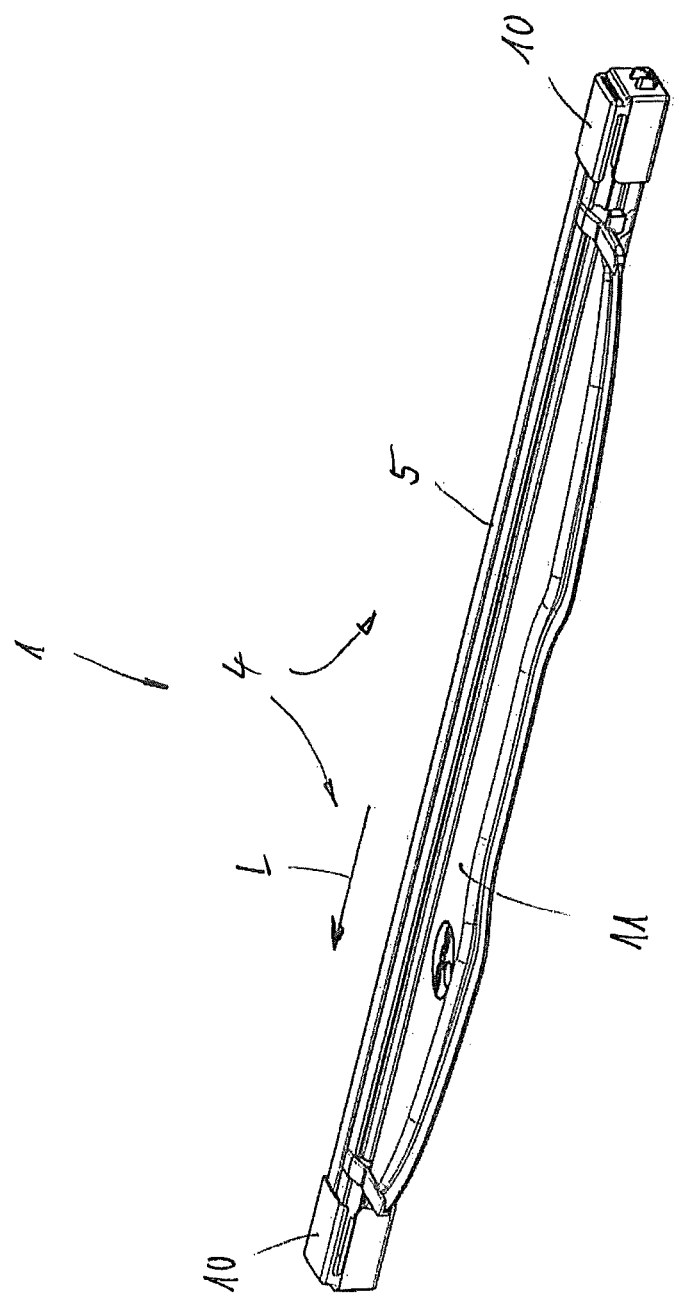
FIG. 1 shows a schematic perspective illustration of an embodiment of a protective device according to the invention which is in the form of a loading-space cover for a passenger vehicle and has an embodiment of a housing according to the invention.
Figure 2:
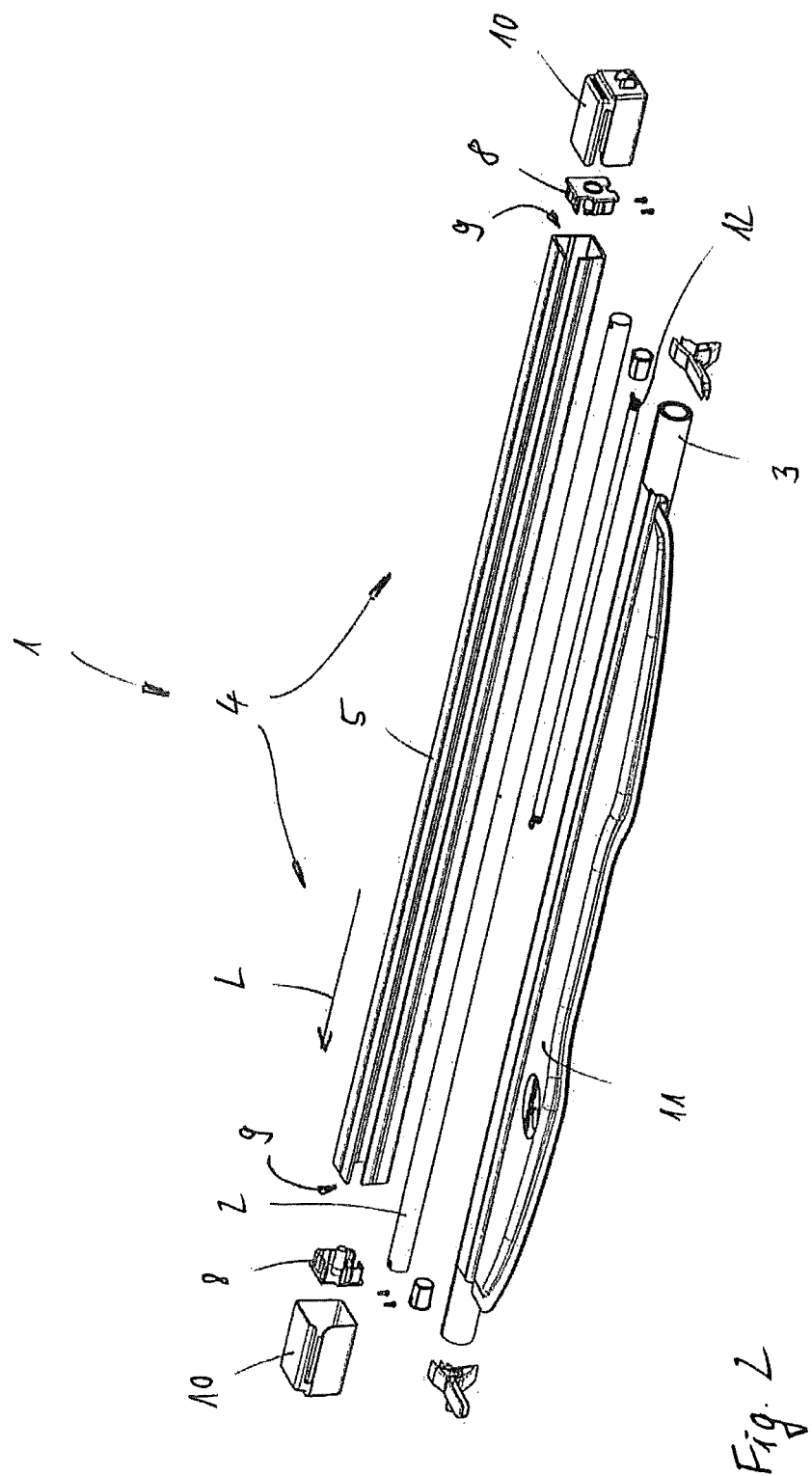
FIG. 2 shows a schematic perspective view of an exploded illustration of the protective device according to FIG. 1.

FIGS. 1 and 2 show a protective device 1 in the form of a cover for a loading space of a station wagon. The protective device 1 has a winding shaft 2 and a flexible sheet-like structure 3 in the form of a roller-blind web, which is retained on the winding shaft 2 at one end such that it can be wound up thereon and unwound therefrom. The flexible sheet-like structure 3 is illustrated, both in FIG. 1 and in FIG. 2, in a wound-up state, which can also be referred to as the stowage position. In order to accommodate the winding shaft 2 and the flexible sheet-like structure 3, the protective device 1 has a housing 4 with a housing profile 5, which extends along a longitudinal direction L. The housing profile 5 has an angular profile cross section 6 (FIG. 6), which bounds an accommodating space A for accommodating the winding shaft 2 and the flexible sheet-like structure 3. In addition, the housing profile 5 has a profile opening 7, which extends into the accommodating space A.

In a state in which it is installed, ready for use, the winding shaft 2 is arranged in the accommodating space A and, at each end, is mounted in a rotatable manner on a bearing element 8 of the housing 4. The bearing elements 8 here are fitted into a respective end opening 9 of the housing profile 5 and are joined together therewith in a manner which is known in principle. In order for the protective device 1 to be mounted on the vehicle, the housing 4 has end caps 10, which are arranged at the ends of the housing profile 5. The end caps 10 are each fitted onto the ends of the housing profile 5, as seen in the longitudinal direction L. When they have been installed in the vehicle, the end caps 10 are secured in a releasable manner, in a manner which is known in principle, with form-fitting and/or force-fitting action on complementary accommodating portions in the loading space. A contour plate 11 is arranged at an end of the flexible sheet-like structure 3 which is directed away from the winding shaft 2. In order for the flexible sheet-like structure 3 to be transferred from the stowage position, which is illustrated in the drawing, into a function position, in which it covers the loading space, the flexible sheet-like structure 3 can be unwound from the winding shaft 2 by means of the contour plate 11 being subjected to a pulling movement oriented transversely to the longitudinal direction L. The flexible sheet-like structure 3 here is displaced through the profile opening 7. In the functional position, the flexible sheet-like structure is opened out in an essentially planar state, in a manner which is known in principle. In order for the flexible sheet-like structure 3 to be transferred from the functional position into the stowage position, the winding shaft 2 is assigned a winding spring 12. The winding spring 12 has one end secured to the winding shaft 2 and the other end secured to the right-hand bearing element 8—as seen in relation to the plane of the drawing in FIG. 2. Accordingly, during an unwinding movement of the winding shaft 2, the winding spring 12 is prestressed and gives rise to a torque which acts in the winding-up direction around the axis of rotation of the winding shaft 2. This torque serves to wind up the flexible sheet-like structure 3.

As can be seen, in particular, with reference to FIGS. 3 to 6, the housing profile 5 is formed from a panel-like semifinished product 13 which is manufactured from a plastic K and—in a ready-for-use state (FIGS. 1, 2, 5, 6)—is angled along at least one predetermined folding line 14, which extends in the longitudinal direction L, in order for the angular profile cross section 6 to be formed.

The panel-like semifinished product 13 is flat and has a rectangular elongate basic shape. A length to width ratio here is approximately 10:1. The panel-like semifinished product has three longitudinally extending predetermined folding lines 14, which are oriented parallel to one another. In order for the housing profile 5 to be formed, starting from the configuration which can be seen with reference to FIGS. 3 and 4, the semifinished product 13 is angled along the predetermined folding lines 14. The profile cross section 6 here has an approximately rectangular basic shape, and therefore the semifinished product 13 is angled in each case approximately at right angles along the predetermined folding lines 14.

Irrespective of the profile opening 7, the profile cross section 6 here is in the form of a box in the manner of a slotted, rectangular hollow profile. This configuration is not imperative. In the case of an embodiment which is not illustrated, the semifinished product 13 can be angled merely along one predetermined folding line 14. This gives rise to an L-shaped basic shape of the profile cross section 6. In the case of a further embodiment which is not illustrated, the semifinished product 13 can be angled along two predetermined folding lines 14. This gives rise to a C-shaped or U-shaped basic shape of the profile cross section 6.

Figure 4:
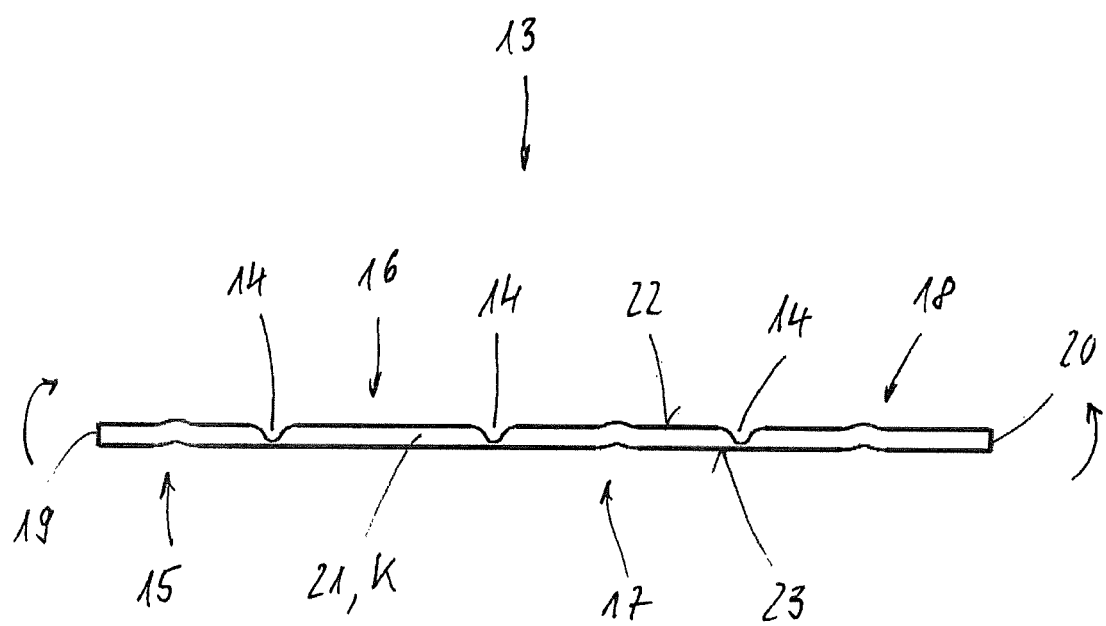
FIG. 4 shows an enlarged illustration of a side view of the panel-like semifinished product according to FIG. 3.

As can be seen with reference to FIG. 4, the predetermined folding lines 14 here are each designed in the form of a depression 14 which is prefabricated on the semifinished product 13. These depressions 14 are formed on the semifinished product 13 in a manner which will be described in more detail. The depressions 14 here extend in a continuous manner over an entire length of the semifinished product 13, and therefore over an entire length of the housing profile 5. In an embodiment which is not illustrated, the depressions 14 can be interrupted in some regions. The predetermined folding lines or depressions 14 provide for a simplified shaping of the semifinished product 13, and therefor the latter can be angled through 90° in a geometrically defined manner, and with the reduced amount of force being applied, in order for the housing body 5 to be formed. The depressions 14 each form a weakening in the semifinished product 13. As a result of this weakening, the semifinished product 13 folds in a defined manner, under a corresponding bending load, in the region of the predetermined folding lines. The bending load is clearly shown by way of the moment arrow in FIG. 4.

In more specific terms, in order for the housing profile 5 to be formed here, first of all a first profile-wall portion 15 of the semifinished product 13 is angled upward through approximately 90° in relation to a second profile-wall portion 16. Thereafter, a third profile-wall portion 17 is angled upward through approximately 90°, in the opposite direction, relative to the second profile-wall portion 16. A fourth profile-wall portion 18 is displaced in the process together with the third profile-wall portion 17. The fourth profile-wall portion 18 is then angled relative to the third profile-wall portion 17 under the action of a corresponding bending load, this giving rise to the configuration of the profile cross section 6 which can be seen with reference to FIG. 6 and/or the configuration of the housing profile 5 which can be seen with reference to FIG. 5. In the configuration which can be seen with reference to FIG. 6, the depressions 14 are directed toward the accommodating space A and, as a result of the above-described deformation of the semifinished product 13, are, as it were, folded together. In addition to facilitating the angling operation described, the depressions 14 here ensure correctly angled shaping of the profile cross section 6, since excess material in the corner regions of the profile cross section 6 is avoided.

Figure 3:
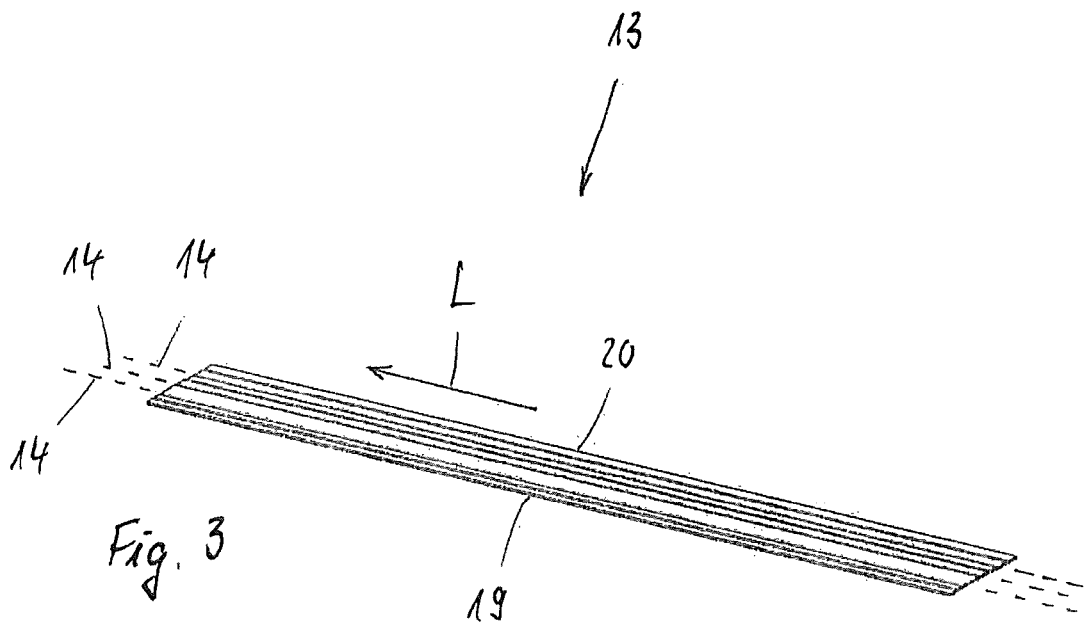
FIG. 3 shows a schematic perspective illustration of a panel-like semifinished product which is manufactured from plastic and is provided for forming the housing of the protective device according to FIGS. 1 and 2.

The profile opening 7 is formed here between ends 19, 20 of the panel-like semifinished product 13 which are angled in relation to one another. In the non-angled configuration of the semifinished product 13, the ends 19, 20 are arranged opposite one another in a direction perpendicular to the longitudinal direction L (FIGS. 3 and 4).

Figure 5:
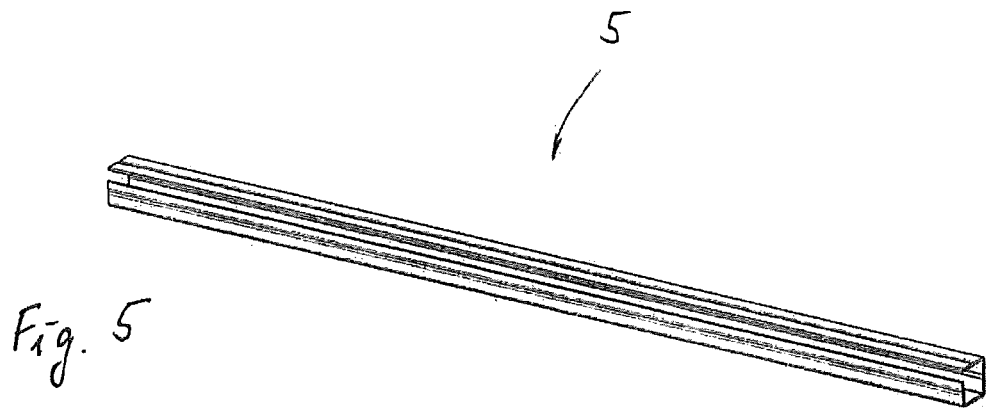
FIG. 5 shows a schematic perspective illustration—in the same viewing direction as FIG. 3—of a housing profile of the protective device according to FIGS. 1 and 2, said housing profile being manufactured from the semifinished product according to FIGS. 3 and 4.
Figure 6:
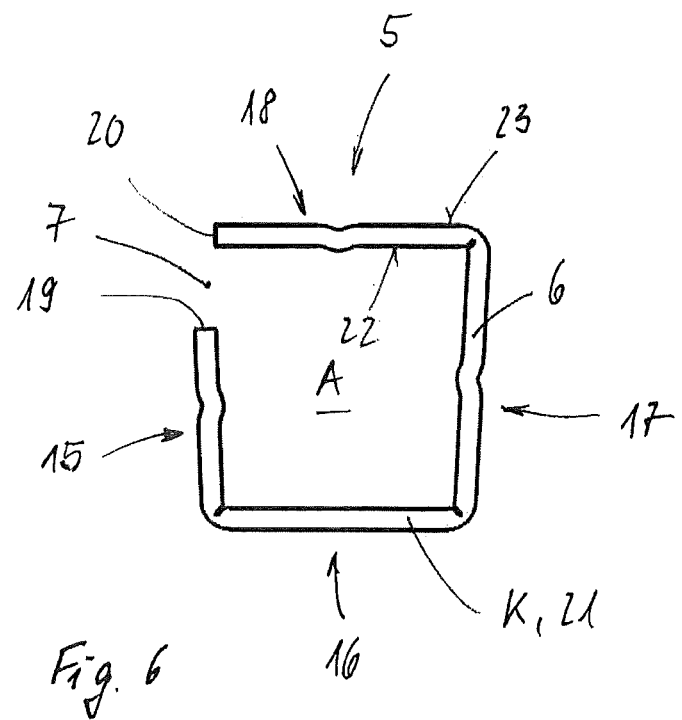
FIG. 6 shows an enlarged illustration of a side view of the housing profile according to FIG. 5.

The housing profile 5 here, and therefore the semifinished product 13, has a layered construction with a plurality of different material layers 21, 22, 23. The material layers 21, 22, 23 here are not illustrated to scale and can be seen, in particular with reference to FIG. 4, merely in a schematically highly simplified form. A first of the material layers here is a load-bearing carrying-structure layer 21. The carrying-structure layer 21 is manufactured from the plastic K and provides the housing profile 5 with strength and mechanical stability. The plastic K selected here is a glass-fiber-reinforced polypropylene. The further material layers 22, 23 are arranged on either side of the carrying-structure layer 21, as seen in the thickness direction of the layered construction, and are fixed to said carrying-structure layer in the manner which will be described in more detail. One of the material layers is a damping layer 22. The damping layer 22 here is manufactured from a felt and, in the configuration which can be seen with reference to FIGS. 5 and 6, is arranged on the inside. The damping layer 22 therefore forms an inner surface of the housing profile 5, said inner surface being directed toward the accommodating space A. A further material layer here is a covering layer 23, which is manufactured from a covering material (not referred to in any more detail). The covering layer 23 is arranged on a flat side of the carrying-structure layer 21, said flat side being directed away from the damping layer 22, and forms an outer surface of the housing profile 5. The covering material here is consistent with a covering material (not illustrated specifically) of the motor-vehicle interior and can be, for example, a textile padding material, a leather or the like.

The panel-like semifinished product 13 here is produced by means of compression molding. Compression molding is a method which is known, in principle, in the field of plastics technology and engineering for the purpose of producing planar or slightly curved components on plastics. Both the layered construction with the material layers 21, 22, 23 and the predetermined folding lines in the form of the depressions 14 are formed here directly during the compression molding of the semifinished product 13. This provides for particularly straightforward and cost-effective manufacturing of the semifinished product 13, and therefore of the housing profile 5.

Figure 7:
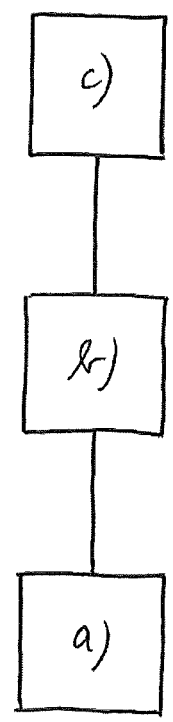
FIG. 7 shows a simplified illustration of a block diagram of an embodiment of a method according to the invention for producing the housing of the protective device according to FIGS. 1 and 2.

A method for producing the housing 4 is illustrated schematically, in highly simplified form, with reference to FIG. 7. In the case of the method, in a step a) the panel-like semifinished product 13, which is manufactured from plastic, is angled along at least one—in the present case along three—predetermined folding lines 14. For this purpose, the semifinished product 13 is heated in a step b), which precedes the step a) in time. While the semifinished product 13 is being heated in step b), it is softened to become flexible at least in the region of the predetermined folding lines 14, and therefore the angling of step a) can take place with a reduced amount of force being applied. In a step c), which precedes the heating operation of step b) and the angling operation of step a) in time, the panel-like semifinished product 13 is formed by virtue of at least the plastic K being subjected to compression molding, wherein, in the present case, the predetermined folding lines in the form of the depressions 14 are formed at the same time. The step c) here, in addition, provides for at least one of the further material layers 22, 23 to be subjected to compression molding together with the plastic K.

For avoidance of repetition, reference is otherwise made to the description, in conjunction with FIGS. 1 to 6, relating to the production of the housing profile 5, which can apply correspondingly to the method according to FIG. 7.

The invention claimed is:

1. A housing for a protective device for a motor-vehicle interior and for accommodating at least one winding shaft and at least one flexible sheet-like structure retained on the winding shaft such that the at least one flexible sheet-like structure can be wound up on the winding shaft and unwound from the winding shaft, the housing having a housing profile extending along a longitudinal direction, the housing profile having an angular profile cross-section bounding an accommodating space for accommodating the at least one winding shaft and the at least one flexible sheet-like structure, the housing profile having a profile opening extending into the accommodating space and through which the at least one flexible sheet-like structure can be displaced during a winding-up operation thereof into the accommodating space and/or during an unwinding operation out of the accommodating space, wherein the housing profile is formed from a panel-like semifinished product manufactured from plastic and, in a ready-for-use state, the semifinished product is angled along at least one predetermined folding line extending in the longitudinal direction of the housing profile in order for the angular profile cross-section to be formed.

2. The housing according to claim 1, wherein the at least one predetermined folding line is prefabricated on the semifinished product.

3. The housing according to claim 1, wherein the profile opening is formed between ends of the semifinished product which are angled in relation to one another.

4. The housing according to claim 1, wherein the profile cross-section has a C-shaped, U-shaped or rectangular shape, the semifinished product being angled a number of times so as to have adjacent portions oriented at right angles relative to one another.

5. The housing according to claim 1, wherein the semifinished product of the housing profile comprises a layered construction having a plurality of different material layers.

6. The housing according to claim 5, wherein one of the plurality of different material layers comprises a load-bearing structure layer manufactured from plastic.

7. The housing according to claim 6, wherein the plastic of the load-bearing structure layer is a glass-fiber-reinforced polypropylene.

8. The housing according to claim 5, wherein one of the plurality of different material layers comprises a damping layer manufactured from a sound-damping material, the damping layer being arranged on an inside of the housing profile facing the accommodating space.

9. The housing according to claim 5, wherein one of the plurality of different material layers comprises a covering layer manufactured from a covering material, the covering layer being arranged on an outside of the housing profile facing away from the accommodating space, said covering material of the covering layer corresponding to a covering material of the motor-vehicle interior.

10. The housing according to claim 1, wherein the semifinished product is produced by compression molding.

11. A method for producing a housing according to claim 1, comprising manufacturing a panel-like semifinished product from plastic and angling the semifinished product along at least one predetermined folding line extending in the longitudinal direction.

12. The method according to claim 11, comprising heating the semifinished product prior to the angling of the semifinished product.

13. The method according to claim 11, comprising subjecting at least one plastic to compression molding to form the panel-like semifinished product, the compression molding forming the at least one predetermined folding line in the semifinished product.

14. The method according to claim 13, wherein, together with the at least one plastic, at least one further material layer is subjected to the compression molding.

15. A protective device for a motor-vehicle interior, comprising:
at least one winding shaft;
at least one flexible sheet-like structure retained on the winding shaft such that the at least one flexible sheet-like structure is windable on the winding shaft and unwindable from the winding shaft, the flexible sheet-like structure being displaceable between a protective position and a wound-up stowage position; and
a housing having a housing profile extending along a longitudinal direction, the housing profile having an angular profile cross-section bounding an accommodating space for accommodating the at least one winding shaft and the at least one flexible sheet-like structure in the wound-up stowage position, the housing profile having a profile opening extending into the accommodating space and through which the at least one flexible sheet-like structure can be displaced during a winding-up operation thereof into the accommodating space and/or during an unwinding operation out of the accommodating space, wherein the housing profile is formed from a panel-like semifinished product manufactured from plastic and, in a ready-for-use state, the semifinished product is angled along at least one predetermined folding line, the at least one predetermined folding line extending in the longitudinal direction of the housing profile in order for the angular profile cross-section to be formed.

16. The housing according to claim 8, wherein the damping layer comprises a felt.

17. A protective device for a motor-vehicle interior, said protective device comprising:
a winding shaft;
a flexible sheet retained on said winding shaft such that said flexible sheet is windable on said winding shaft and unwindable from said winding shaft, said flexible sheet being displaceable between a protective position in which said flexible sheet is at least partially unwound from said winding shaft and a storage position in which said flexible sheet is wound around said winding shaft; and
an elongate housing defining a longitudinal direction, said housing having a housing profile extending along the longitudinal direction, said housing profile including a plurality of wall portions, adjacent ones of said wall portions being disposed in a transverse orientation relative to one another, said wall portions together defining an accommodating interior space of said housing profile, said winding shaft being disposed in said accommodating interior space, said housing profile having an elongate opening through which said accommodating interior space opens to an exterior of said housing profile, said flexible sheet being displaceable through said opening during a winding up operation of said flexible sheet onto said winding shaft and during an unwinding operation of said flexible sheet from said winding shaft, said housing profile comprising a panel product comprising plastic, said panel product comprising a prefabricated fold line extending in the longitudinal direction between said adjacent ones of said wall portions, said prefabricated fold lines permitting formation of said transverse orientation of said adjacent ones of said wall portions relative to one another.

18. The protective device according to claim 17, wherein said panel product comprises a layered construction including a plurality of different material layers.

19. The protective device according to claim 18, wherein a first of said material layers comprises a load-bearing plastic layer, and a second of said material layers comprises a sound-damping layer disposed on an inside of said housing profile facing said accommodating interior space.

20. The protective device according to claim 19, wherein a third of said material layers comprises a covering layer arranged on an outside of said housing profile facing away from said accommodating interior space, said covering layer corresponding to a vehicle-interior covering material, said load-bearing plastic layer being disposed between said covering layer and said sound-damping layer.

21. The protective device according to claim 20, wherein two of said adjacent ones of said wall portions have respective free ends spaced away from the respective prefabricated fold line, said free ends having respective terminal edges spaced from one another to define said opening therebetween.

22. The protective device according to claim 17, wherein said panel product comprises compression-molded plastic.

* * * * *